United States Patent
Ries

(10) Patent No.: US 6,584,991 B1
(45) Date of Patent: Jul. 1, 2003

(54) WASHER

(75) Inventor: Kevin Lyall Ries, Taranaki (NZ)

(73) Assignee: Hi-Per Wash Limited, New Plymouth (NZ)

(*) Notice: Subject to any disclaimer, the term of this patent is extended or adjusted under 35 U.S.C. 154(b) by 0 days.

(21) Appl. No.: 09/700,801

(22) PCT Filed: May 28, 1999

(86) PCT No.: PCT/NZ99/00064

§ 371 (c)(1),
(2), (4) Date: Nov. 20, 2000

(87) PCT Pub. No.: WO99/60871

PCT Pub. Date: Dec. 2, 1999

(30) Foreign Application Priority Data

May 28, 1998 (NZ) ................................................ 330332

(51) Int. Cl.[7] .................................................. B08B 3/04
(52) U.S. Cl. ..................... 134/131; 134/122 R; 134/199
(58) Field of Search ................................ 15/3.15, 3.14; 134/122 R, 64 R, 131, 199, 133; 406/88, 93

(56) References Cited

U.S. PATENT DOCUMENTS

| 2,261,560 A | * | 11/1941 | Pellas et al. |
| 2,805,898 A | * | 9/1957 | Willis, Jr. |
| 3,055,378 A | * | 9/1962 | Alford |
| 3,447,544 A | * | 6/1969 | Devergara |
| 3,582,144 A | * | 6/1971 | Woolard |
| 3,610,696 A | * | 10/1971 | Fulton |
| 3,734,567 A | * | 5/1973 | Fong |
| 3,948,564 A | * | 4/1976 | Flint |
| 4,131,320 A | * | 12/1978 | Volat et al. |
| 4,305,210 A | * | 12/1981 | Christensen et al. |
| 4,458,703 A | * | 7/1984 | Inoue et al. |
| 4,557,785 A | * | 12/1985 | Ohkuma |
| 5,413,131 A | | 5/1995 | Medlock |
| 5,762,082 A | * | 6/1998 | Canestaro |
| 5,937,877 A | * | 8/1999 | Rodriguez |
| 5,951,006 A | * | 9/1999 | Biegelsen et al. |
| 6,241,427 B1 | * | 6/2001 | Hessburg et al. |

FOREIGN PATENT DOCUMENTS

| GB | 2141989 | * | 1/1985 |
| JP | 61-86311 | * | 5/1986 |
| JP | 62-35531 | * | 2/1987 |
| JP | 2-8121 | * | 1/1990 |
| JP | 2-209319 | * | 8/1990 |

* cited by examiner

Primary Examiner—Frankie L. Stinson
(74) Attorney, Agent, or Firm—Young & Thompson

(57) ABSTRACT

A washer for use in industrial applications includes a housing with a series of opposing spray nozzles. Material to be processed entering the housing is suspended between the opposing spray nozzles under fluid pressure and, by virtue of the angle of the opposing spray nozzles, the material is both transported and cleaned on its way through the washer.

12 Claims, 4 Drawing Sheets

1

WASHER

CROSS REFERENCE TO RELATED APPLICATION

This is the 35 USC 371 national stage of International Application PCT/NZ99/00064 filed on May 28, 1999, which designated the United States of America.

FIELD OF THE INVENTION

The present invention relates to a washer but more particularly a washer for washing material in industrial applications.

BACKGROUND OF THE INVENTION

In industries such as food technology or mineral processing washing and screening systems are generally utilised to clean and separate raw materials from unwanted matter. For example, many vegetables must be cleaned of dirt etc following harvesting.

Traditionally washing systems include the processes of transportation, washing and screening. Transportation of the material through the washing system is usually achieved by a conveyor-type system. Conventional sprays (water or chemical solutions) may then wash material on the conveyor or in a shaker screen system which separates particles into various size ranges.

These traditional systems involve a large number of mechanical moving parts, therefore a high level of maintenance is required dependent upon the application and the environment within which the system is used. Furthermore, in the food technology sector, it is difficult to establish and maintain acceptable hygiene standards using available equipment.

SUMMARY OF THE INVENTION

It is an object of the present invention to provide a washer that combines the separate processes of transportation and cleaning required by conventional washer systems into a single process thereby overcoming or going some way to overcoming the problems outlined above.

In one broad aspect of the invention there is provided a washer system including a housing, a series of opposing spray nozzles mounted within said housing, said spray nozzles in operation being supplied with fluid under pressure and means to allow material to be processed to enter the housing, wherein said material to be processed becomes substantially suspended between said opposing spray nozzles under fluid pressure, the spray nozzles being disposed at an angle to the direction the material to be processed is transported through said housing to thereby cause movement of the material to be processed through the housing.

The washer of the present invention is described herein with reference to a preferred embodiment. It will be appreciated by those skilled in the art that the washer of the present invention may take on several alternative forms and be applicable to a wide range of industries. Furthermore, the basic principles of construction may be combined with additional processing systems as required. It is also anticipated that modifications to the operating specifications of the washer are likely depending on the application. Particularly, the operating pressure of the washer will be varied in order to perform a washing function on different materials.

DESCRIPTION OF THE PREFERRED EMBODIMENT

The embodiment illustrated is intended to display the novel construction of the present invention and is effectively a prototype. The operating pressure of fluid within the illustrated embodiment is nominally 300 psi.

Figure 1:
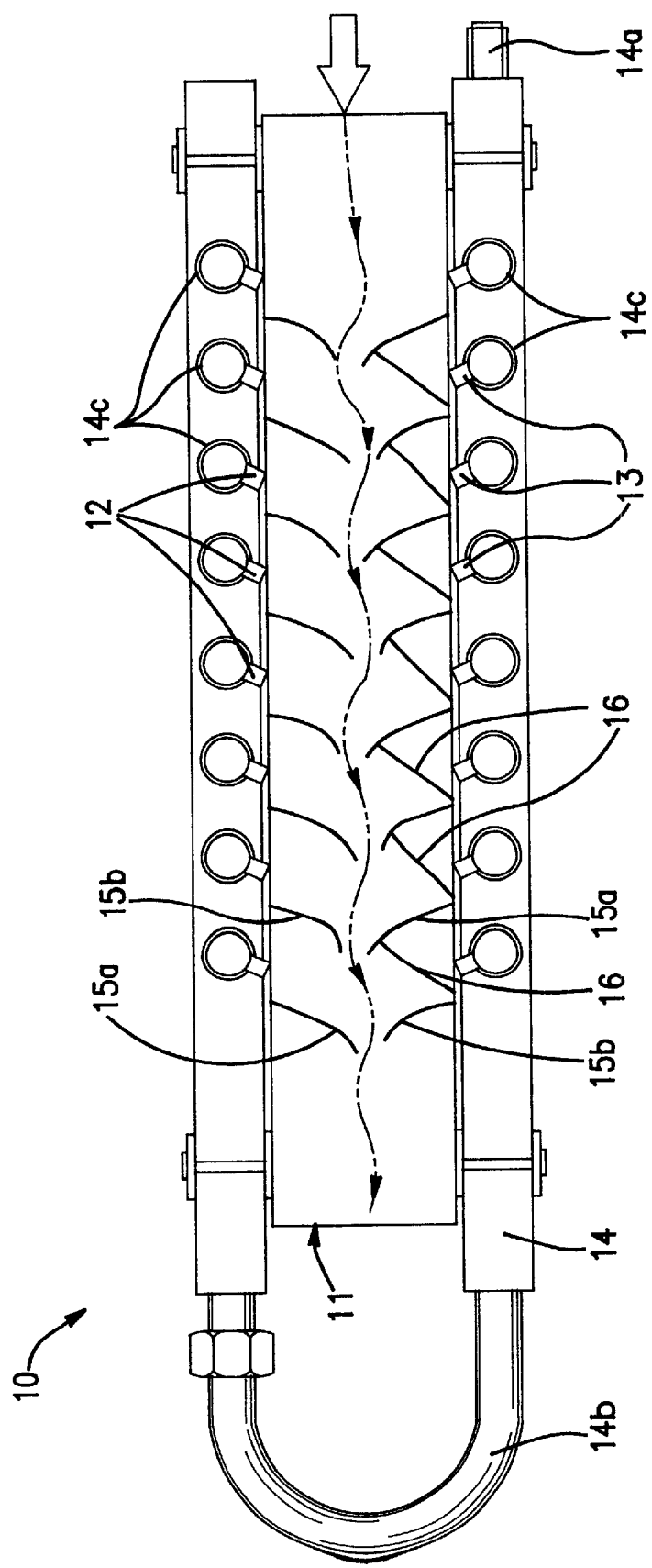
FIG. 1 is a detailed side elevation view of a washer according to the present invention.

FIG. 1 best illustrates the characteristic operation of the washer according to the present invention. The washer 10 includes a housing 11 through which material to be processed can flow (indicated by the dotted line and arrows), a series of upper and lower nozzles 12 and 13 respectively, a manifold 14 and internal baffle pairs 15a and 15b. Additionally, extending from a floor of housing 11 toward the baffles 15a/15b, are catchment elements 16.

Water or other washing solutions (eg. detergents, solvents, caustic) are introduced to the system under pressure via inlet 14a of the manifold 14. Fluid flow is distributed to the upper nozzles 12 through a transfer pipe 14b.

It is apparent from FIG. 1 that the respective nozzles 12 and 13 are slightly "angled forward" in the intended direction of material flow. Each nozzle 12 has a corresponding substantially opposite nozzle 13 such that, in use, the pressurised fluid stream from each nozzle 12 and 13 meets substantially at a centre line of housing 11.

The collective action of all nozzle pairs 12 and 13 creates a path through the housing 11 in the direction of the arrows. Effectively, material which enters housing 11 is transported through the fluid path by virtue of the nozzle pairs 12 and 13.

Preferably opposing nozzle pairs 12 and 13 produce a fluid "cone" or "fan" to distribute the fluid and create a wider path.

The nozzles 12/13 create a pressure jet which washes and transports material through a series of vortexes. The washing function is greatest at the impact zone of the fluid from opposing nozzles 12/13. The forward motion to transport the material is provided by the angles at which the nozzles are set to create a venturi effect. The material is drawn into the wash process in the form of a slurry by this venturi effect. The degree of washing through the washer is controlled by the variable pressure, nozzle angle and baffle design.

The slurry of material is generally produced in a feeder hopper (not illustrated) by adding liquid to the material to be processed. The feeder hopper then supplies unprocessed material into housing 11 (at the bold arrow on FIG. 1).

During transport through housing 11 it will be apparent that the material is under constant bombardment from both sides by fluid pressure. Thus unwanted particles (dirt, residues etc) are removed from the material. This is an improvement over known conveyor washing systems where material may only be cleaned from one side.

Internal baffles 15a and 15b further direct the pressurised fluid flow to ensure even transportation of material. The baffles 15a and 15b, like nozzles 12 and 13, are arranged in evenly spaced pairs. However, in the preferred embodiment the baffle pair 15a and 15b, each extending from the roof and floor of housing 11, are unevenly sized. Baffle 15a generally extends further toward the centre line of housing 11 than the corresponding opposite baffle 15b. Both baffles 15a and 15b include a curved distal end following the direction of material flow through housing 11. The effect of this "uneven" arrangement is to cause the material path to undulate and therefore increase the travelling (washing) distance.

Material exiting housing 11 leaves considerably cleaner than when entering. The wash solution run-off carries away the impurities removed from the material.

Figure 2:
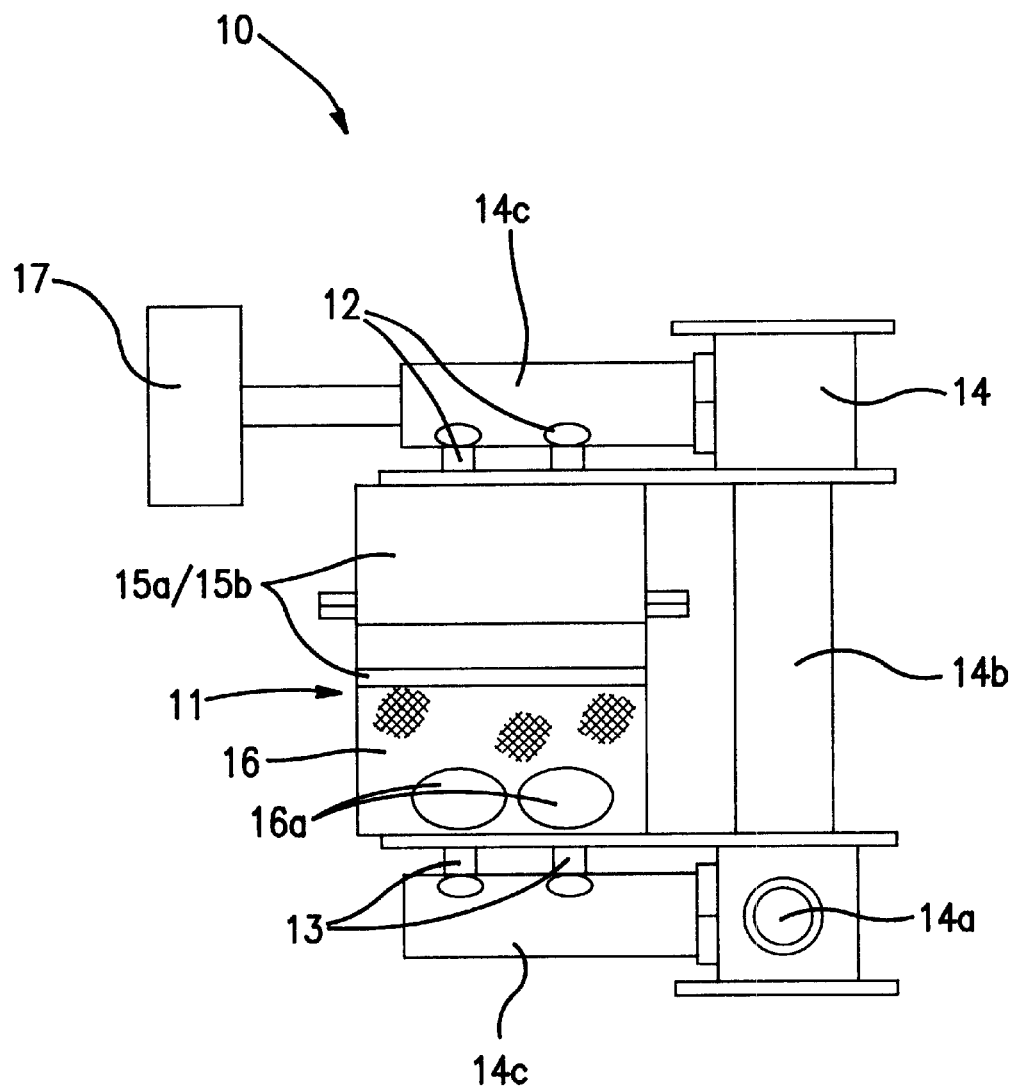
FIG. 2 is an end elevation view of the washer illustrated by FIG. 1.

FIG. 2 illustrates the fluid inlet 14a more clearly and also shows the dual nature of the nozzles 12 and 13 located upon spray boom 14c extending from manifold 14. The upper and lower nozzles pairs 12 and 13 are arranged in sets of two along the spray boom 14c to aid fluid distribution across the width of housing 11.

Figure 3:
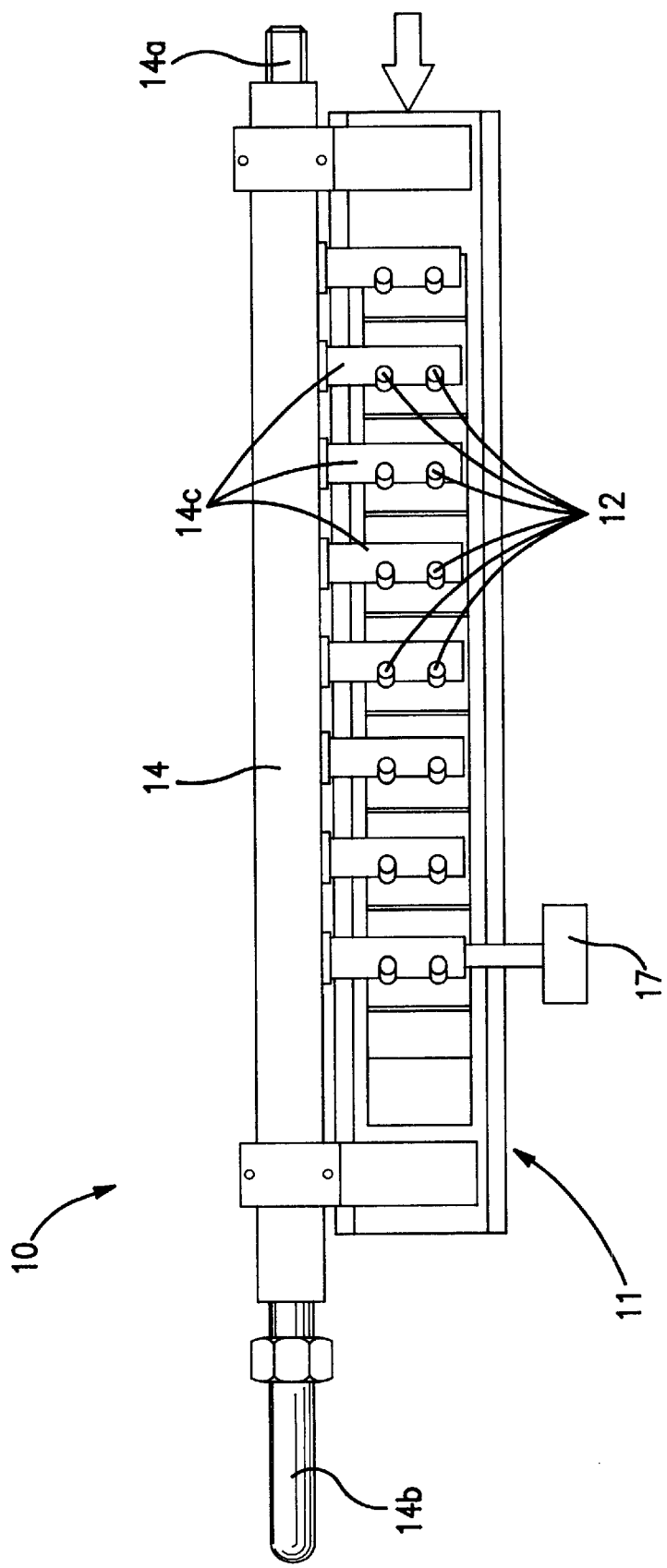
FIG. 3 is a plan view of the washer illustrated by FIG. 1.
Figure 4:
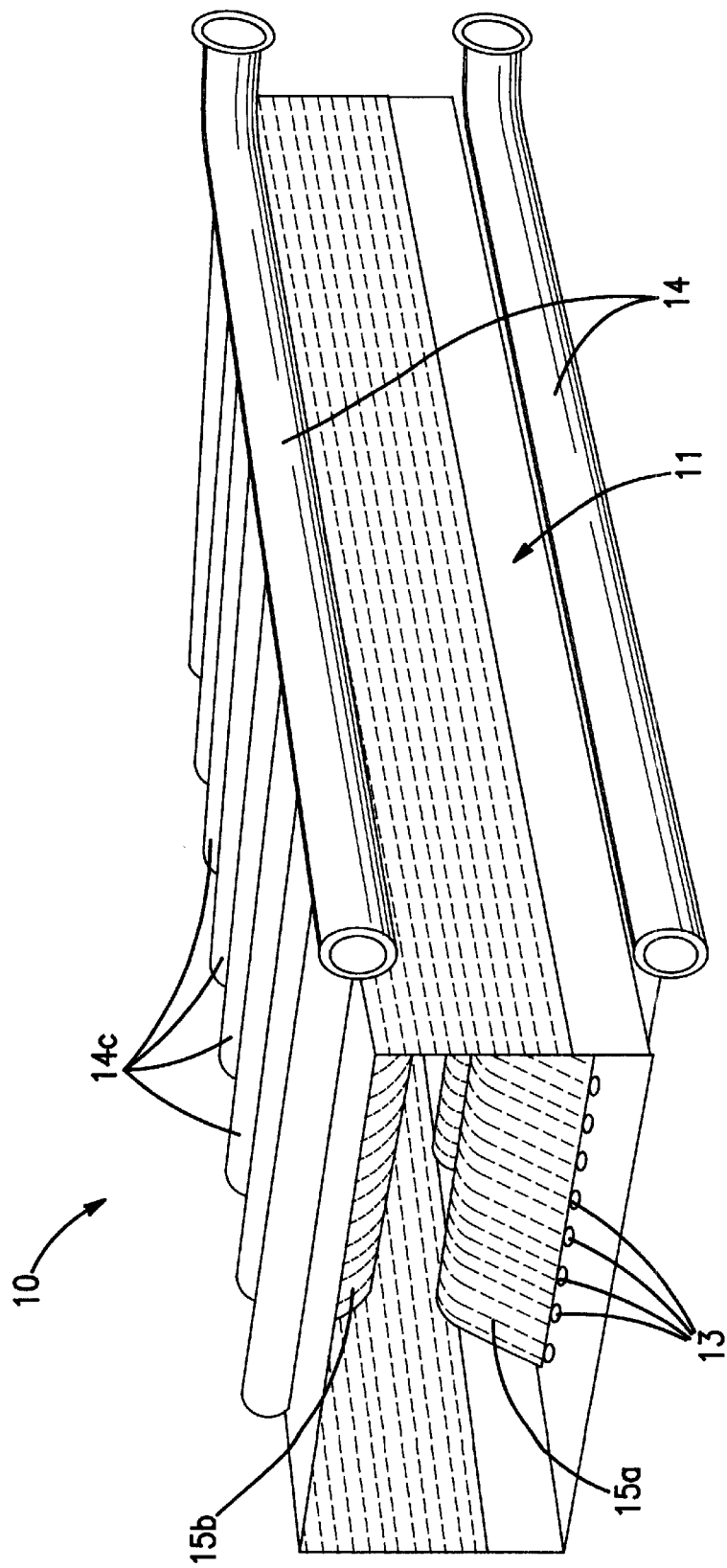
FIG. 4 is a general perspective view of an alternative embodiment of a washer according to the present invention.

FIG. 2 (as FIGS. 1 and 3) illustrates a preferred embodiment constructed principally for prototype purposes. FIG. 4 illustrates an alternative embodiment wherein the opposing nozzles 12/13 are arranged in sets of eight. It will be apparent that the washer can be easily modified to provide wider flow paths by adding more nozzles 12/13.

The construction of catchment elements 16 can be clearly seen in FIG. 2.

Catchment elements 16 are preferably formed from a mesh which allows fluid run-off from the cleaning/transport path to pass through and be collected. Furthermore, two apertures 16a are formed in catchment element 16 corresponding to each set of nozzles located on spray boom 14c. Apertures 16a allow unhindered operation of the spray nozzles through element 16. The catchment elements 16 when combined with the venturi effect of the clashing fluid streams from nozzles 12/13 ensure that no processed material is lost within housing 11. Any material thrown out of the material path (dotted line in FIG. 1) rolls down the mesh catchment elements 16 and is blasted back upward into the fluid stream.

A pressure gauge 17 in communication with the fluid within manifold 14 provides a guide for an operator to ensure recommended parameters are maintained.

In the preferred embodiment the nozzle pairs 12/13 are substantially opposite with "mirror image" spray angles (20°–30° to the vertical) to ensure the streams meet at or near the centre-line of housing 11. It is possible that nozzle pairs be arranged on a slight offset with corresponding adjustments to the respective nozzle angles, however, it is not likely that this configuration is optimal.

It will be apparent to those skilled in the art that the nozzle angle and fluid pressure will be the prime determinants of washer speed. In extremely high pressure operations (eg. 10000 psi) the nozzle angle is likely to be reduced (or a longer housing with additional opposing nozzle pairs constructed) to ensure the required processing time.

The washer according to the present invention has application in a wide range of industries. In food technology, the washer may be utilised at low pressure to provide an hygienic, cost effective and efficient method of processing assorted food products (eg. coleslaw). In the plastics recycling industry a low to medium pressure configuration may be employed to provide a cost effective and environmentally sound method for cleaning plastic granules contaminated by oil and chemicals etc. In industrial/mineral applications a medium to high pressure configuration of the washer provides a cost effective and efficient method of processing mineral and industrial by-products.

Furthermore, in some of the above applications the washer performs an inherent separating function, eg. in gold processing, extreme pressure can be used to blast apart clay (which exits with the run-off of wash water) to leave gold nuggets behind. A similar effect is found in coal mining where coal dust/ash is removed from the coal particles and washed away.

The washer of the present invention involves no mechanical moving parts other than the pumping systems required for generating fluid pressure to manifold inlet 14a (not illustrated by the drawings). This represents a significant improvement in overall efficiency over conventional conveyor systems.

At present a simple collection basket means (not illustrated) is used at the exit end of the washer 10 to collect processed particles which tend to shoot out of housing 11 with relatively high velocity. Advanced embodiments may utilise more sophisticated collection techniques and ensure no processed product is lost.

It is envisaged that material could pass through multiple washers utilising different washing solutions that are set up in a serial sequence to achieve the required cleanliness in the finished product.

The washer according to the present invention is intended to operate in pressure ranges of 90 to 10000 psi, dependent upon the required application. As a consequence of the range of pressures involved, a variety of nozzle types will be needed. Brass cone nozzles are sufficient for low pressure applications. Hardened stainless steel and ceramic cone nozzles would be utilised in medium pressure applications. High pressure applications call for fan nozzles capable of withstanding the wear associated with these pressures. Fan nozzles avoid the misting effect created by cone nozzles at high pressures.

At 300 psi (as in the embodiment illustrated) the nozzles would be of the cone type known to those skilled in the art.

The remainder of the hardware associated with the washer is preferably constructed from stainless steel where appropriate. Where significant wear resistance is required other suitable hardened materials suited to the application will be used.

The washer of the present invention represents a considerable improvement over conventional systems used for equivalent applications and eliminates the need for separate conveyor systems within a washer.

What is claimed is:

1. A washer comprising:

a housing;

a series of opposing spray nozzles mounted within said housing; said spray nozzles in operation being supplied with fluid under pressure;

a series of baffles disposed within the housing, thereby partitioning the series of opposing spray nozzles; and means to allow material to be processed to enter the housing, wherein said material to be processed becomes substantially suspended between said opposing spray nozzles under fluid pressure;

said spray nozzles being disposed at an angle to the direction the material to be processed is transported through said housing to thereby cause movement of the material to be processed through the housing.

2. The washer according to claim 1, wherein the spray nozzles are mounted on a manifold.

3. The washer according to claim 2, wherein the manifold extends to all spray nozzles to achieve a single fluid pressure.

4. The washer according to claim 1, wherein the baffles are shaped and arranged to alter the course of material to be processed passing through the housing to provide an undulating material path through said housing.

5. The washer according to claim 1, further comprising a catchment element disposed between the series of baffles.

6. The washer according to claim 5, wherein the catchment element includes one or more apertures to allow fluid from the nozzles to pass therethrough.

7. The washer according to claim 5, wherein a surface of the catchment element is formed from a mesh material.

8. The washer according to claim 1, further comprising a hopper located at an entry to the washer to supply the material to be processed.

9. The washer according to claim 8, further comprising means for supplying liquid to the hopper to form a slurry with the material to be processed.

10. The washer according to claim 1, further comprising a collection means disposed at an exit end of the washer.

11. The washer according to claim 1, further comprising a pressure gauge.

12. The washer according to claim 1, wherein each of the opposing spray nozzles comprises a plurality of opposing nozzles.

* * * * *